Feb. 8, 1944.　　　　M. WINTERHALTER　　　　2,341,404
METHOD OF MAKING SLIDING CLASP FASTENERS
Original Filed Aug. 28, 1936　　2 Sheets-Sheet 1
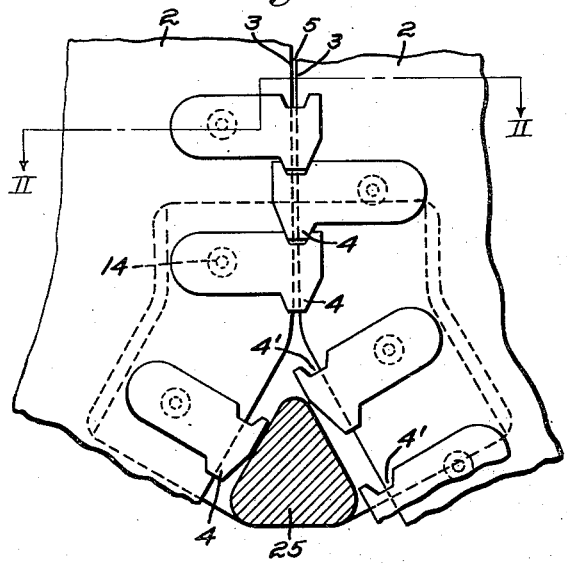
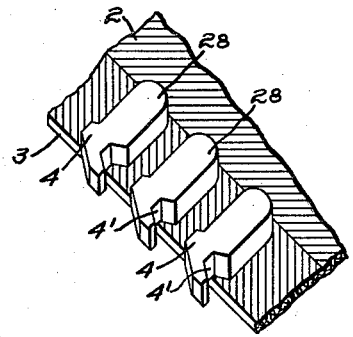
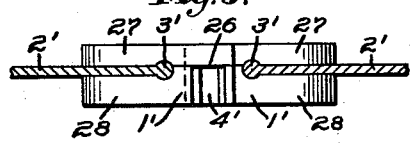
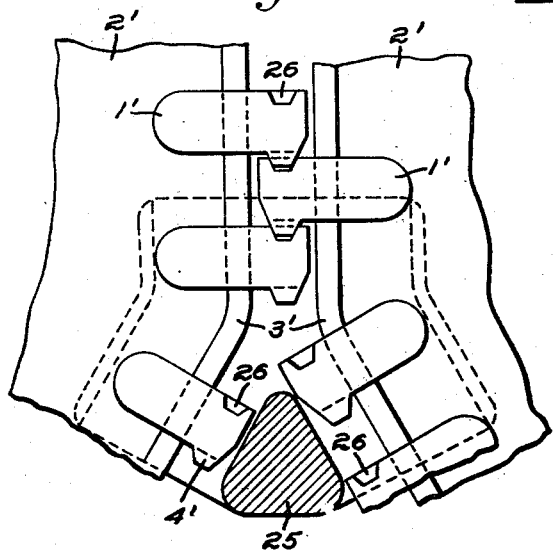
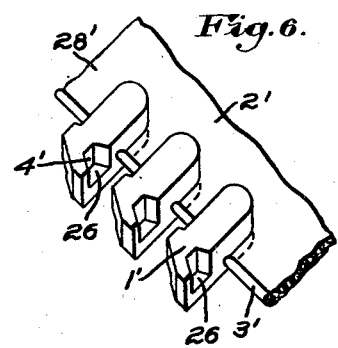
Inventor:
Martin Winterhalter,
Attys.

Feb. 8, 1944. M. WINTERHALTER 2,341,404
METHOD OF MAKING SLIDING CLASP FASTENERS
Original Filed Aug. 28, 1936 2 Sheets-Sheet 2
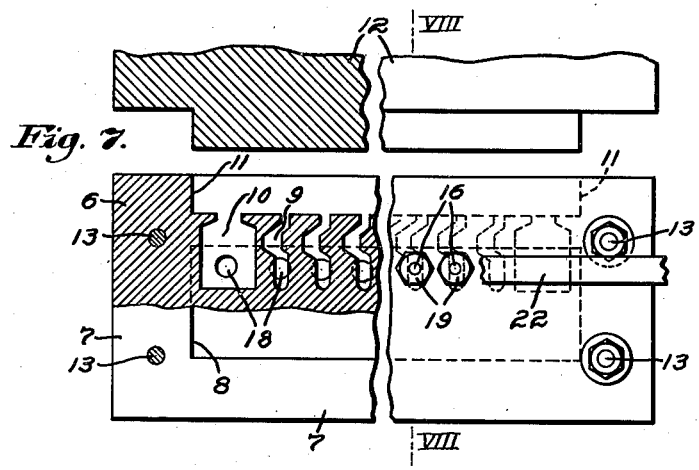
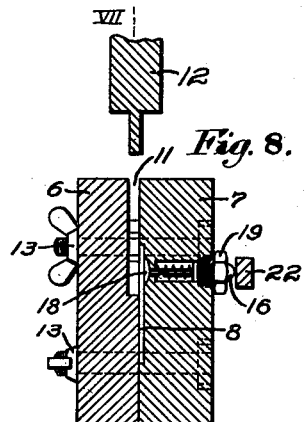
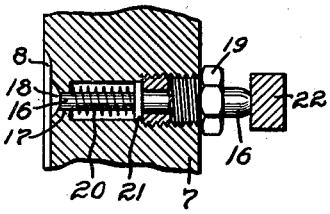
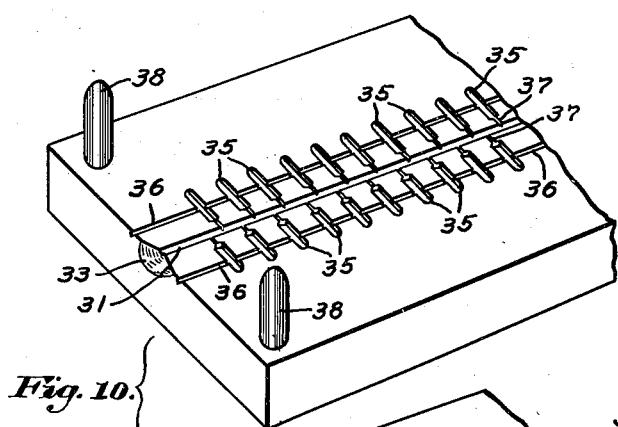
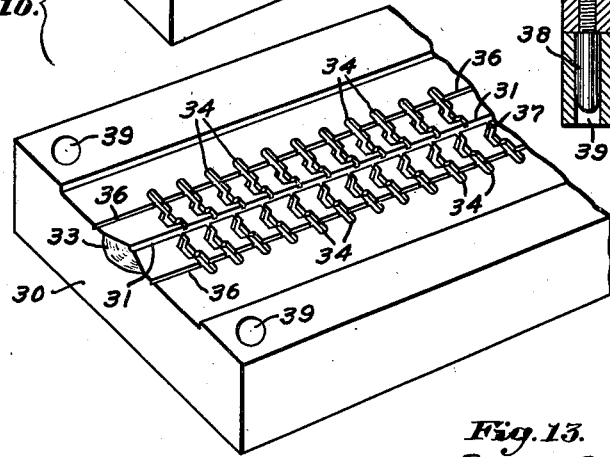
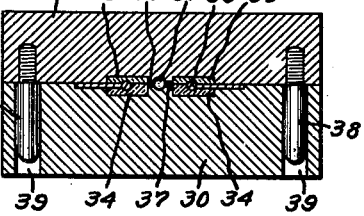
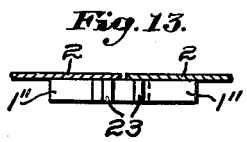
Inventor:
Martin Winterhalter,
by Emery Booth Townsend Miller & Weidner
Attys.

Patented Feb. 8, 1944

2,341,404

UNITED STATES PATENT OFFICE 2,341,404

METHOD OF MAKING SLIDING CLASP FASTENERS

Martin Winterhalter, Morcote-Castello, near Lugano, Switzerland

Original application August 28, 1936, Serial No. 98,308. Divided and this application March 22, 1941, Serial No. 384,709. In Switzerland September 19, 1935

6 Claims. (Cl. 18—59)

This is a division of my co-pending application Serial No. 98,308 filed August 28, 1936, Patent No. 2,239,803, granted April 29, 1941.

My invention relates to an improved method of making sliding clasp fasteners of the type wherein two flexible stringers are adapted to be connected and disconnected by two sets of interlocking fastener members cooperating with a slider mounted upon both sets of members, and it particularly relates to the production of such fasteners by casting or moulding a suitable substance directly on to the edge of the flexible stringer. The interlocking fastener members comprise two essential portions namely, the coupling members proper which are formed with coupling projections and coupling recesses, the coupling projections on one stringer engaging the coupling recesses on the other stringer and vice versa. The coupling members proper are attached to the stringers by means of shanks. The coupling members proper prevent separation of the stringers in the plane of the stringers. As a rule it is essential to prevent also separation of the stringers in a plane at right angles to the plane of the fastener and this is attained by providing further means which stop relative movement in this direction. This means may, for instance, consist in portions which close the coupling recesses at one or both ends.

The primary object of the invention is to provide an improved method of moulding or casting the interlocking fastener members, and simultaneously attaching them to the stringers, by which the coupling recesses and projections have the moulding flash only at their ends so that the entire coupling surface of the coupling recess and the coupling projection is entirely free from mould flash. The result is that the projection is very well seated in the recess, there being no mould flash between the projection and the recess.

Another object of the invention is to effect by the improved method a very reliable attachment of the interlocking members to their stringers whilst retaining the primary advantage of the invention namely, the freedom of the coupling recesses and projections from mould flash over the entire coupling surfaces except the ends of said surfaces. Another object of the invention is to provide very simple means for preventing disengagement in a plane at right angles to the plane of the fastener.

The invention is applicable to various forms of interlocking fastener members and may be carried out by means of various kinds of apparatus and it is particularly pointed out that the construction of the interlocking fastener members themselves and the construction of the moulding or casting apparatus for making the interlocking members and attaching them to the stringers is fully described and claimed in my above mentioned Patent No. 2,239,803 and in my Patents No. 2,184,265, granted December 19, 1939, and No. 2,270,985, granted January 27, 1942, on divisional applications based on the application on which said above mentioned Patent No. 2,239,803 was granted.

I will now describe three constructional forms of the interlocking members and two constructions of casting or moulding apparatus for making these constructions.

In the accompanying drawings:

Fig. 1 shows the first construction of a sliding clasp fastener in a bottom plan view;

Fig. 2 is a section on line II—II of Fig. 1;

Fig. 3 is a perspective view of a portion of a stringer and several interlocking members thereon;

Fig. 4 is a bottom view of a second construction of a sliding clasp fastener;

Fig. 5 is a transverse sectional view corresponding to Fig. 4;

Fig. 6 is a perspective view of a portion of a stringer and several interlocking members of the second construction;

Fig. 7 shows apparatus for producing the sliding clasp fastener according to Figs. 1 to 3, in elevation and section on the line VII—VII of Fig. 8;

Fig. 8 is a section on the line VIII—VIII of Fig. 7;

Fig. 9 is a section to larger scale of detail of Fig. 8;

Fig. 10 is a perspective view of the upper and lower portions of a mould for producing the sliding clasp fastener according to Figs. 4 to 6;

Fig. 11 is a cross section of the complete mould in the closed position;

Fig. 12 is a bottom plan of a third construction of the fastener showing the two stringers and interlocking members thereon in the closed position; and Fig. 13 is a transverse section of Fig. 12.

Referring first to Figs. 1 to 3, the sliding clasp fastener illustrated comprises two stringers 2, 2, on the opposed longitudinal edges 3 of which are arranged the mutually engaging interlocking fastener members 1 having coupling projections 4 and coupling recesses 4', which members can be brought into and out of engagement with one another by means of a slider 25. The interlocking members are arranged laterally on the stringers 2 and their coupling parts proper 4 and 4' are formed of a trapezoidal rib and corresponding groove which extend over the whole thickness of the interlocking members. The coupling portions of the interlocking members are, as shown in Fig. 3, fixed to the stringer by shanks 28, the interlocking members lying entirely on one side of the stringer. In this construction tearing apart of the stringer in the plane of the fastener is effected by the coupling portions 4 and 4' engaging one another as shown in Fig. 1. Tearing apart of the stringers in a plane at right angles to the complete fastener is prevented in this construction by the fact that the stringers project under the coupling recesses. As shown in Fig. 1 the stringers are brought close together so that their front edges 3, 3 are separated only by a very small gap 5, but it may be pointed out that it is not essential that the stringers should upon their whole length engage under the recesses 4'. It would be sufficient for one or a few of these recesses to be engaged.

If it is desired to strengthen the attachment of the interlocking members to their stringers, rivets 14', 15 may be produced in the same operation as will hereinafter be described. These rivets are shown particularly in Fig. 2 and they are integral with the material forming the shanks 28.

Figs. 4, 5, and 6 show the second construction of the fastener. 2', 2' indicate the stringers which in this construction may be provided with reinforced front edges 3', 3'. The locking members are designated by the numerals 1', 1' and are again provided with coupling projections 4 and coupling recesses 4'. The difference between this construction and the one previously described is the fact that in addition to the shanks 28, there are shanks 27 for attaching the interlocking members to the other sides of the stringers 2'. These shanks are forwardly extended beyond the edges of the stringers so that they close the coupling recesses at the end adjacent to the stringer. It will be seen particularly from Figs. 5 and 6 that each recess has a bottom 26 lying in the plane of the stringer. In this construction the mould flash of the recess again appears at the end of the recess that is, in the plane of the bottom 26 so that the whole coupling surface of the recess is free from mould flash. The mould flash on the coupling projection 4 appears in the same plane as will be clear from the description of the apparatus used for making this construction and the operation hereinafter described.

For producing the sliding clasp fastener according to Figs. 1 to 3, the apparatus shown in Figs. 7 to 9 can be used. It consists of a two-part press mould 6, 7. The mould half 7 is provided with a recess or cut-out portion 8 which serves to receive the stringer 2 during the moulding and attaching of the interlocking members. This cut-out portion for taking the stringer could also be arranged in the mould half 6. The mould half 6 is provided with recesses 9 and 10 which during the moulding or casting operation are covered by the mould half 7, and which form the individual moulds for the interlocking members and the end members of the clasp fastener. It will be understood that a predetermined length of stringer is thus clamped between the two mould halves and that a predetermined number of interlocking members including the end members of the fastener are produced simultaneously so that the article made is a complete stringer with all the locking members and end members fixed thereto.

After placing a stringer 2 in the cut-out portion of the mould half 7, the mould halves 6 and 7 are closed together by the wing screws 13 thus securely clamping the stringer. The moulding material is introduced into a groove 11 formed in the mould half 6 and is forced by means of a press ram 12 into the individual moulds 9 and 10, the latter being heated according to the type of material to be used, the material and the degree of heating thereof being, however, so chosen that there is no likelihood of burning of the material or of the stringers.

During the pressing operation, a portion of the material penetrates into the stringer, which is preferably made of a porous material, for example cloth. In this way, the interlocking members are fastened to one side of the stringer. As the coupling recesses and the coupling projections extend to the plane of division of the two moulds 6 and 7 which is also the plane of the stringer, mould flash will appear only at the end of these recesses and projections and there will be no mould flash at all upon the whole of the coupling surfaces of the recesses and the projections.

In order, however, to be able to use non-porous or only slightly porous stringers, or in the case of porous stringers in order to obtain additional attachment of the locking members to the stringers, provision is made for forming at the same time rivets connecting the shanks of the locking members to the other side of the stringer. These rivets are produced by perforating the stringer during the casting operation. For this purpose needle-like rams 16 are arranged in the mould half 7 corresponding to the individual moulds 9, 10, which rams are movable at right angles to the groove 8 and the stringer placed therein. The rams are slidable each in a guide 17 which opens into a semi-spherical recess 18 which communicates with the recess 8 and serves for forming the rivet head 15 shown in Fig. 2.

At the other end the rams 16 are guided each in a screw 19 the end of which lying in the mould half 7 serves as a stop for the rams 16, a spring 20 being provided which has the purpose of forcing the rams 16 with their stop 21 towards the screw 19. The rams 16 are simultaneously actuated by a pressure rod 22 at their ends projecting out of the screw 19.

The moulding of the rivets 14, 15 is effected during the moulding of the interlocking members in that, on pressing the material into the parts 9, 10 of the mould, the rams 16 are forced by means of the press rod 22 against the action of the springs 20 through the stringer and are advantageously held in this position until the individual moulds are completely filled with the material. Then, that is to say, during the action of the press ram 12, the rams 16 are free for returning to their original positions and they move back under the action of the springs 20. In this way, material, under the action of the press ram 12, follows the rams 16 and fills the holes formed in the stringer and the recesses 18 lying behind. It will be understood that instead of providing a rivet for each interlocking member, several rivets might be provided.

To produce the construction of stringer shown in Figs. 4 to 6, the apparatus shown in Figs. 10 and 11 may be used. This apparatus again consists of a two-part mould having an upper half 29 and a lower half 30. The upper half and the lower half have a trough 31 which is formed at one end with a widened portion 33 forming, when the mould is put together, a casting gutter. Depressions or recesses 34, 35 are arranged in both mould halves on both sides of the channels 31 which are connected by small channels 37 with the channels 31 and form the individual moulds for the interlocking members 1' according to Figs. 4 to 6. In this way, the individual moulds are the same distance from one another as are the members in the finished clasp fastener. Moreover, suitable recesses 36 are provided for the stringers 2'. The form of the members and the division of the mould are so chosen that the coupling parts proper of the members are moulded exclusively in one of the mould parts and indeed, for example, the lower part 30, whilst in the upper parts of the mould are formed only the one fastening shank 27 and the front wall 26 of the members serving for the one-sided closing of the coupling recess 4'. With this arrangement, during the moulding of the members, the formation of burrs crossing the coupling parts is prevented in that the division of the mould lies on one side at the end of the coupling parts. As in the modified arrangement the upper and lower parts of the mould must register accurately when in position, the upper part is provided with pins 38 and the lower part with corresponding holes 39.

The manufacture of the sliding clasp fastener according to Figs. 4 to 6 is effected with the aid of the moulds (Figs. 9–11) in a simple manner in that firstly, the two stringers 2' are laid in the corresponding recesses 36 of the lower part 30 of the mould, the upper part is then laid on the lower part, the pins 38 of the upper part penetrating into the holes 39 of the lower part. The moulds are then securely clamped together by means of clamps or between dies. Then, the heated material serving for the formation of the members is forced in through the casting gutter 33 into the longitudinal channel 31 from which the material flows through the small branch channel 37 into the individual moulds of the members, fills the latter and according to the permeability of the stringer also penetrates the latter between the shanks 27, 28. After the pressing of the mould has been completed and after the setting of the material, the upper part of the mould is removed, the stringers with the finished members and the dead or waste ends are taken out of the lower part, whereupon by slight agitation, the dead or waste ends can be broken away from the members. The stringers, after arranging the slider, are then connected together at one of their ends by special members and are provided at their other ends with end members which prevent the sliding off of the slider. Naturally, in this case also, the end members can be produced with the other members in the mould.

In the embodiment according to Figs. 12 and 13, the coupling parts proper of the members 1'' in contradistinction to the other embodiments consist of two parallel ridges 23 and recesses 24. Moreover, the interlocking members 1'' are arranged in the same manner on their stringers as in the embodiment according to Figs. 1–3, and can therefore be made in a corresponding manner.

This construction of fastener can be produced by means of an apparatus very similar to the one shown in Figs. 7 to 9.

It will be understood that the construction of the fastener and the construction of the apparatus can be varied within the scope of the invention, for it is essential only that the interlocking members be so moulded on their stringers that mould flash will not appear upon the opposite surfaces of the coupling recesses and coupling projections, but only at the end of these surfaces.

I claim:

1. The method of making sliding clasp fasteners of the type comprising stringers carrying spaced interlocking members having coupling parts provided with coupling projections and coupling projection receiving recesses, which method comprises placing a length of stringer between the separable portions of a split mould with a face of the stringer in the plane of the mould cavity parting surface, and forming a plurality of the spaced interlocking members by casting them in said mould on the stringer with an end of each of said projections and recesses in the plane of said face of the stringer whereby the mould flash will be confined to such ends.

2. The method according to claim 1 in which the stringer is porous and the material is moulded under pressure to cause it to penetrate the stringer for intimately uniting the interlocking members to the stringer.

3. The method according to claim 1 involving the steps of forming perforations in the stringer after it is positioned in the mould, and moulding the material under pressure to cause it to penetrate such perforations to form rivets or the like for securing the interlocking members to the stringer.

4. The method of making sliding clasp fasteners of the type comprising stringers carrying spaced interlocking members having coupling parts provided with coupling projections and coupling projection receiving recesses which comprises clamping a definite length of stringer between the separable portions of a split mould with a face of the stringer in the plane of the mould cavity parting surface, simultaneously forming a definite number of the spaced interlocking members by casting them in said mould on the stringer, with an end of each of said projections and recesses in the plane of said face of the stringer whereby the mould flash will be confined to such ends.

5. The method according to claim 4 in which the stringer is porous and the material is moulded under pressure to cause it to penetrate the stringer for intimately uniting the interlocking members to the stringer.

6. The method according to claim 4 involving the steps of forming perforations in the stringer after it is positioned in the mould, and moulding the material under pressure to cause it to penetrate such perforations to form rivets or the like for securing the interlocking members to the stringer.

MARTIN WINTERHALTER.